(12) United States Patent
Kitamura et al.

(10) Patent No.: US 10,409,334 B1
(45) Date of Patent: Sep. 10, 2019

(54) KEYBOARD DEVICE AND ELECTRONIC DEVICE

(71) Applicant: LENOVO (SINGAPORE) PTE. LTD., Singapore (SG)

(72) Inventors: Masahiro Kitamura, Yokohama (JP); Mitsuo Horiuchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/022,668

(22) Filed: Jun. 28, 2018

(30) Foreign Application Priority Data

Apr. 2, 2018 (JP) ................................ 2018-070702

(51) Int. Cl.
*G06F 1/16* (2006.01)
*H01H 13/06* (2006.01)

(52) U.S. Cl.
CPC .......... *G06F 1/1662* (2013.01); *G06F 1/1656* (2013.01); *G06F 1/1616* (2013.01); *H01H 13/06* (2013.01)

(58) Field of Classification Search
CPC .... G06F 1/1662; G06F 1/1656; G06F 1/1616; H01H 13/06
See application file for complete search history.

(56) References Cited

U.S. PATENT DOCUMENTS

| | | | | |
|---|---|---|---|---|
| 3,989,338 A * | 11/1976 | Gosser | ................. | H01R 13/465 439/43 |
| 4,471,189 A * | 9/1984 | Bacon | ........................ | B41J 5/12 200/302.2 |
| 4,664,030 A * | 5/1987 | Siverson | ................ | B41F 17/006 101/407.1 |
| 4,851,618 A * | 7/1989 | Amino | .................... | H01H 13/70 200/5 A |
| 5,608,603 A * | 3/1997 | Su | .......................... | G06F 3/0202 200/303 |
| 5,969,644 A * | 10/1999 | Koutaka | ............... | H01H 13/702 200/5 A |
| 6,064,564 A * | 5/2000 | Song | ..................... | G06F 1/1616 361/679.09 |
| 2009/0174994 A1* | 7/2009 | Merz | ..................... | G06F 1/1624 361/679.09 |
| 2009/0279238 A1* | 11/2009 | Kobayashi | ............ | G06F 1/1616 361/679.09 |

(Continued)

FOREIGN PATENT DOCUMENTS

JP 2014153979 A 8/2014

*Primary Examiner* — Abhishek M Rathod
(74) *Attorney, Agent, or Firm* — Shimokaji IP

(57) ABSTRACT

Embodiments provide a keyboard device having high versatility and high waterproof performance and an electronic device having the keyboard device. A keyboard device has a base plate having a plurality of attachment holes through which a plurality of hook members provided in a body chassis of an electronic device can be passed or with which the plurality of hook members can be engaged in the lower surface, a reflection sheet, which is a sheet-like member covering the lower surface of the base plate, and a plurality of keytops provided on the upper surface of the base plate, in which the reflection sheet is provided with cut lines cut in the thickness direction at positions overlapping with the attachment holes in the vertical direction.

9 Claims, 11 Drawing Sheets

(56) References Cited

U.S. PATENT DOCUMENTS

| | | | | |
|---|---|---|---|---|
| 2012/0050973 A1* | 3/2012 | Sakuma | ................ | G06F 1/1662 361/679.09 |
| 2013/0308261 A1* | 11/2013 | Matsumoto | ............... | G06F 1/16 361/679.08 |
| 2017/0110268 A1* | 4/2017 | Tachikawa | ............. | H01H 13/70 |

\* cited by examiner

KEYBOARD DEVICE AND ELECTRONIC DEVICE

TECHNICAL FIELD

The present invention relates to a keyboard device and an electronic device having the keyboard device.

BACKGROUND

An electronic device, such as a notebook personal computer (Laptop PC), carries various kinds of electronic components, such as a substrate and a CPU, under the keyboard device. Therefore, a structure has been demanded so that, when a liquid, such as a beverage, spills onto the keyboard device, the liquid does not leak underneath the keyboard device.

For example, Patent Document 1 discloses a configuration in which the lower surface of a keyboard device is covered with a waterproof sheet in a configuration in which the keyboard device is attached to the upper surface of a chassis of a Laptop PC. The waterproof sheet prevents the liquid from spilling onto the keyboard device from leaking underneath the keyboard device.

[Patent Document 1] Japanese Patent Application Laid-Open No. 2014-153979

SUMMARY OF THE INVENTION

As a method for attaching the above-described keyboard device to a chassis of an electronic device, there can be not only a fixing method using a screw, but also a fixing method for engaging a hook member provided in a chassis with an engagement hole provided in the keyboard device, for example. According to this method, there is a necessity of providing a through-hole through which the hook member can be passed in the waterproof sheet provided in the lower surface of the keyboard device, and then engaged with the engagement hole through the through-hole.

A keyboard device has been demanded of enhanced versatility so as to be shared between chassis of electronic devices of various specifications to thereby reduce the manufacturing cost and the component cost. In order to satisfy the demand, there is a necessity of providing engagement holes at positions compatible with all the arrangements of hook members of chassis of different specifications. Therefore, a case is assumed where some engagement holes are not used depending on the specification of the chassis. In such a case, some through-holes into which the hook members are not actually inserted that are formed in the waterproof sheet, can serve as water leakage holes causing liquid spilling onto the keyboard device to pass underneath the keyboard device. More specifically, such a keyboard device has a concern that the versatility is enhanced but the waterproof performance cannot be secured depending on a mounting target chassis.

The present invention has been made in consideration of the above-described problems of the former technique. It is an object of the present invention to provide a keyboard device having high versatility and high waterproof performance and an electronic device having the keyboard device.

A keyboard device according to a first aspect of the present invention has a base plate having a plurality of attachment holes through which a plurality of hook members provided in a chassis of an electronic device can be passed or with which the plurality of hook members can be engaged in the lower surface, a sheet-like member covering the lower surface of the base plate, and a plurality of keytops provided on the upper surface of the base plate, in which the sheet-like member is provided with cut lines cut in the thickness direction at positions overlapping with the attachment holes in the vertical direction.

According to such a configuration, the lower surface of the base plate of the keyboard device is covered with the sheet-like member, and therefore, even in a case where liquid accidentally enters between the keytops, the liquid can be trapped on the upper surface side of the sheet-like member, so that the leakage of water underneath the keyboard device can be prevented. The sheet-like member is provided with the cut lines at positions overlapping with the attachment holes for attaching the hook members in the vertical direction. Therefore, when the hook members are attached to the attachment holes, the sheet-like member can be easily broken through by the hook members utilizing the cut lines. As a result, the keyboard device can be easily assembled to the chassis of the electronic device. Moreover, the cut lines adhere to the hook members when broken through by the hook members, so that the waterproof performance is secured. Also, when not broken through by the hook members, the inner wall surfaces of the cut lines adhere to each other, so that the waterproof performance is secured. Therefore, when the keyboard device is assembled to a chassis having a small number of installed hook members, for example, the leakage of water through the cut lines corresponding to the attachment holes which are not used is also prevented. Thus, the keyboard device has high versatility and high waterproof performance.

A configuration may be acceptable in which the cut lines extend along the projection direction of claw portions of the hook members in attaching the hook members to the attachment holes. Thus, when the hook members are attached to the attachment holes, the sheet-like member can be easily broken through from the cut lines utilizing the attachment operation.

A configuration may be acceptable in which the cut lines are provided in one set of two lines to one attachment hole and the one set of the cut lines is disposed almost in parallel to each other. Thus, the cut lines can be easily broken through by the hook members while ensuring the high waterproof performance.

A configuration may be acceptable in which the one set of the cut lines are disposed so as to be positionally shifted from each other with respect to the projection direction of the claw portions and a direction orthogonal to the projection direction of the claw portions. Thus, a portion between end portions of the two cut lines can be more easily broken through by the hook members while ensuring the high waterproof performance.

A configuration may be acceptable in which the cut lines are disposed at positions overlapping with the outer shape of the attachment holes as viewed in plan. Thus, the hook members can be attached to the attachment holes as they are while breaking through the sheet-like member, so that the high waterproof performance can be more certainly ensured after the attachment.

A configuration may be acceptable in which the base plate is further provided with a plurality of hole portions through which screws can be passed or into which the screws can be screwed, and the hole portions are provided at positions not overlapping with the cut lines in the vertical direction and are covered with the sheet-like member. Thus, the keyboard device is also compatible with a method for fixing the keyboard device to a chassis of an electronic device using a screw in place of a hook member, so that the versatility is further improved. Moreover, since the sheet-like member covers the portions corresponding to the hole portions for screws, the waterproof performance in portions corresponding to the hole portions which are not used can be secured.

A configuration may be acceptable in which the sheet-like member is provided with a mark indicating the position of each hole portion at a position overlapping with each hole portion in the vertical direction. Thus, the working efficiency in screw fastening is improved.

An electronic device according to a second aspect of the present invention is an electronic device having the keyboard device of the above-described configuration attached to the chassis, in which the hook members breaking through the sheet-like member through at least some of the cut lines are engaged with the attachment holes, whereby the keyboard device is fixed to the chassis.

An electronic device according to a third aspect of the present invention is an electronic device having the keyboard device of the above-described configuration attached to the chassis and further having a frame attached to the upper surface side of the base plate and dividing the keytops, in which the hook members breaking through the sheet-like member through at least some of the cut lines are engaged with the engagement holes provided in the lower surface of the frame through the attachment holes, whereby the keyboard device is fixed to the chassis.

An electronic device according to a fourth aspect of the present invention is an electronic device having the keyboard device of the above-described configuration attached to the chassis, in which the chassis is provided with a frame dividing the keytops, screw holes are formed at positions corresponding to the hole portions in the lower surface of the frame, and screws breaking through the sheet-like member are screwed into at least some screw holes, whereby the keyboard device is fixed to the chassis.

The above-described aspects of the present invention can provide a keyboard device having high versatility and high waterproof performance.

DETAILED DESCRIPTION OF THE INVENTION

Hereinafter, a keyboard device according to the present invention is described in detail with reference to the attached drawings according to preferable embodiments in which an electronic device having the device is exemplified.

Figure 1:
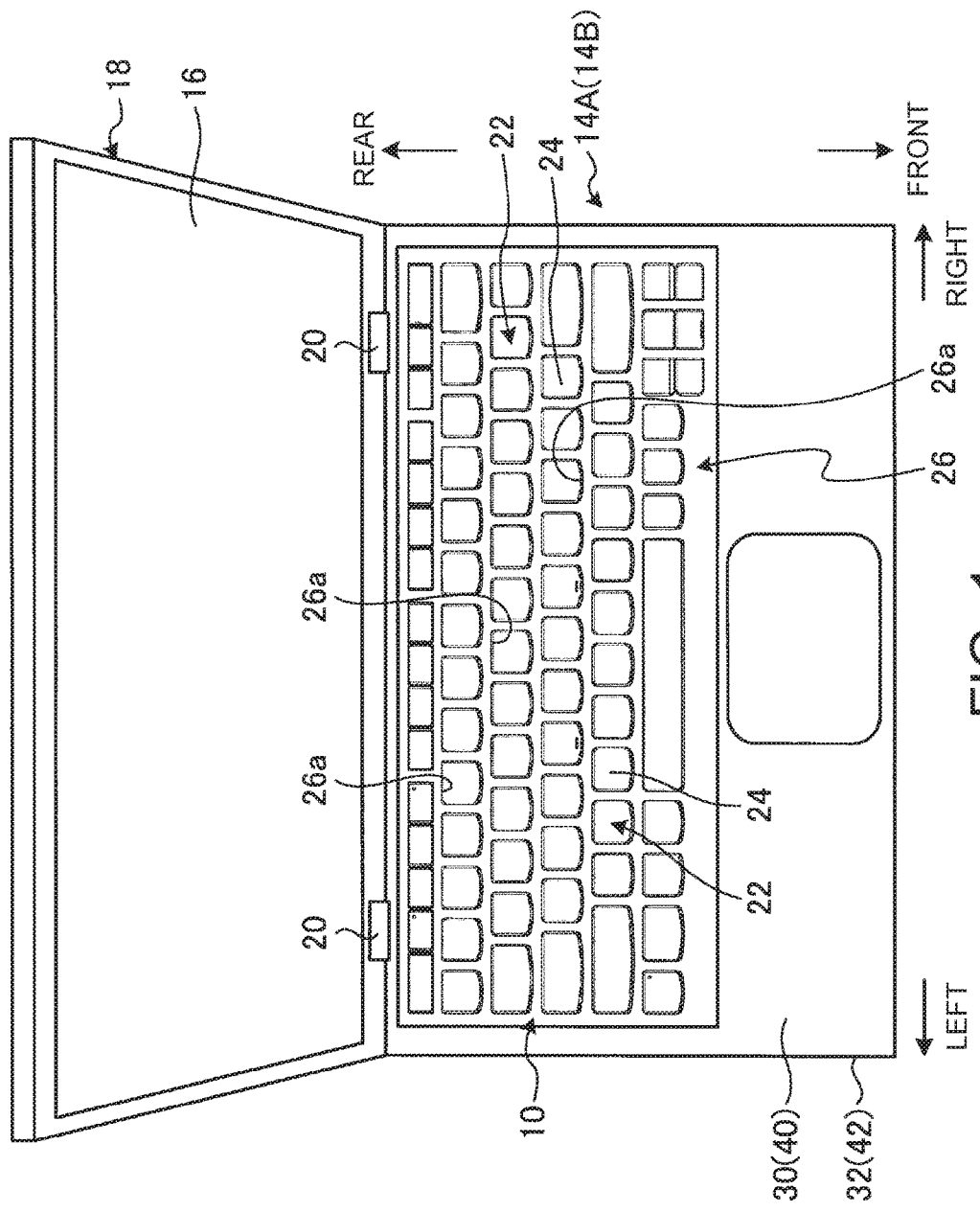
FIG. 1 is a view in which an electronic device carrying a keyboard device according to one embodiment of the present invention is looked down on from above.

FIG. 1 is a view in which an electronic device 12 carrying a keyboard device 10 according to one embodiment of the present invention is looked down on from above. The electronic device 12 is a Laptop PC in which a body chassis 14A (or 14B) provided with the keyboard device 10 and a display chassis 18 provided with a display 16 are connected so as to be openable and closable by hinges 20. In this embodiment, a configuration in which the keyboard device 10 is provided in an electronic device 12 which is a Laptop PC is described as an example. However, the keyboard device 10 can be mounted in chassis of various electronic devices, such as an external chassis for use in a desktop PC, for example, other than the Laptop PC.

Hereinafter, the keyboard device 10 is described defining the front side as the front, the deep side as the rear, the thickness direction as the top and the bottom, and the width direction as the left and the right based on a state where the keyboard device 10 is mounted in the electronic device 12 to be used as illustrated in FIG. 1.

The body chassis (chassis) 14A (14B) accommodates various kinds of electronic components which are not illustrated, such as a substrate, an arithmetic processing device, a hard disk device, and a memory, thereinside. The keyboard device 10 is provided so as to be exposed to the upper surface of the body chassis 14A (14B). The body chassis 14A and the body chassis 14B can carry the common keyboard device 10 but an attachment method and an attachment structure thereof are different from each other. More specifically, the keyboard device 10 of this embodiment has a configuration having such high versatility as to be able to be attached to two kinds of chassis different in the specification, i.e., the body chassis 14A of a first specification and the body chassis 14B of a second specification.

The keyboard device 10 has a plurality of keys 22. The keyboard device 10 is an isolation keyboard device in which the circumference of keytops 24 forming the operation surface of the keys 22 is divided with a frame 26. More specifically, the frame 26 has a plurality of hole portions 26a into which the keytops 24 are inserted so as to be movable in the vertical direction. The keytops 24 are individually independently arranged by the frame 26 demarcating the adjacent keytops 24. The frame 26 is a separate structure from the body chassis 14A with respect to the body chassis 14A of the first specification and is attached to the keyboard device 10 beforehand (see FIG. 2). On the other hand, the frame 26 is integrally structured with the body chassis 14B with respect to the body chassis 14B of the second specification (see FIG. 3).

Figure 2:
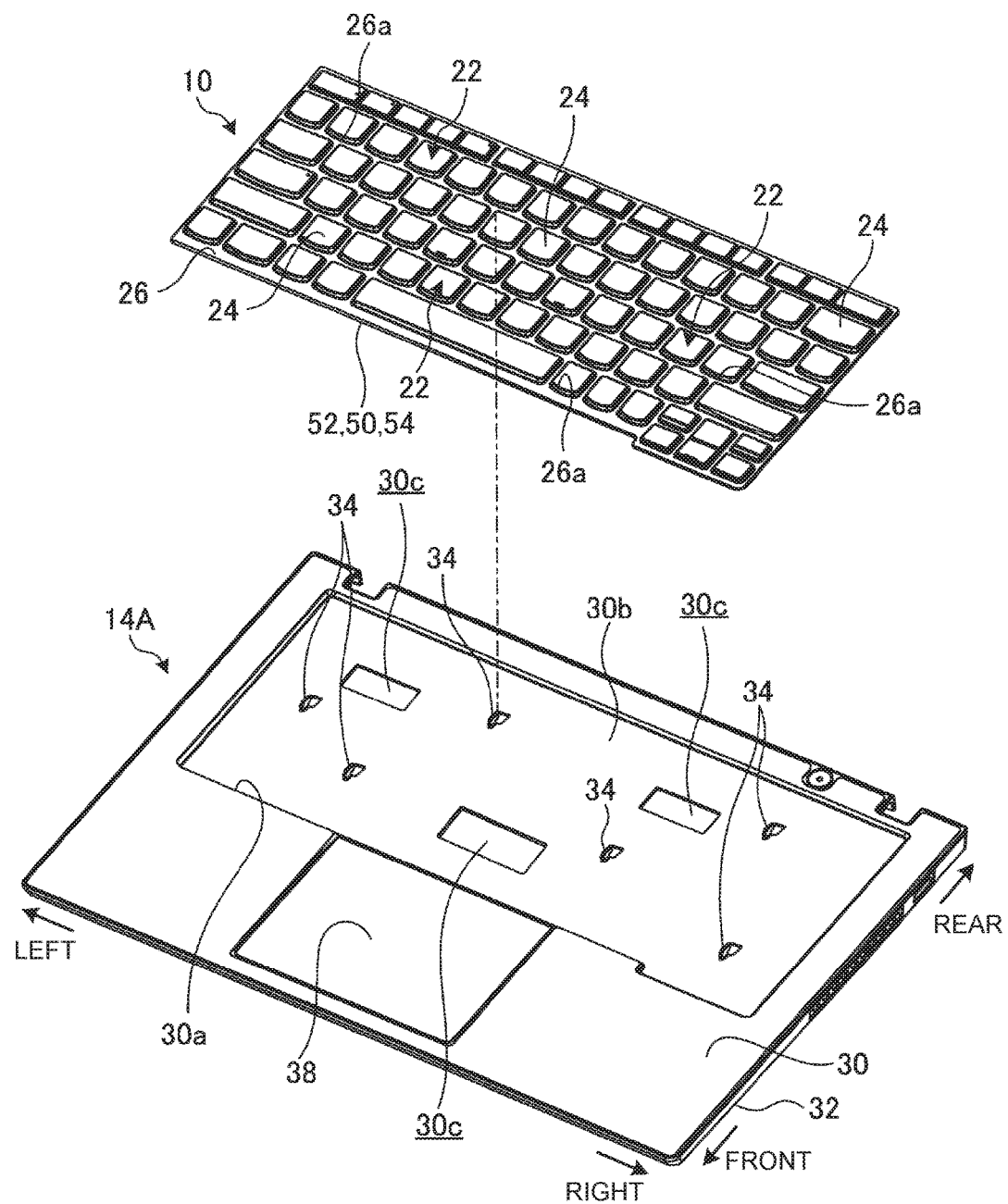
FIG. 2 is an exploded perspective views explaining a state of attaching the keyboard device to a body chassis of a first specification.
Figure 3:
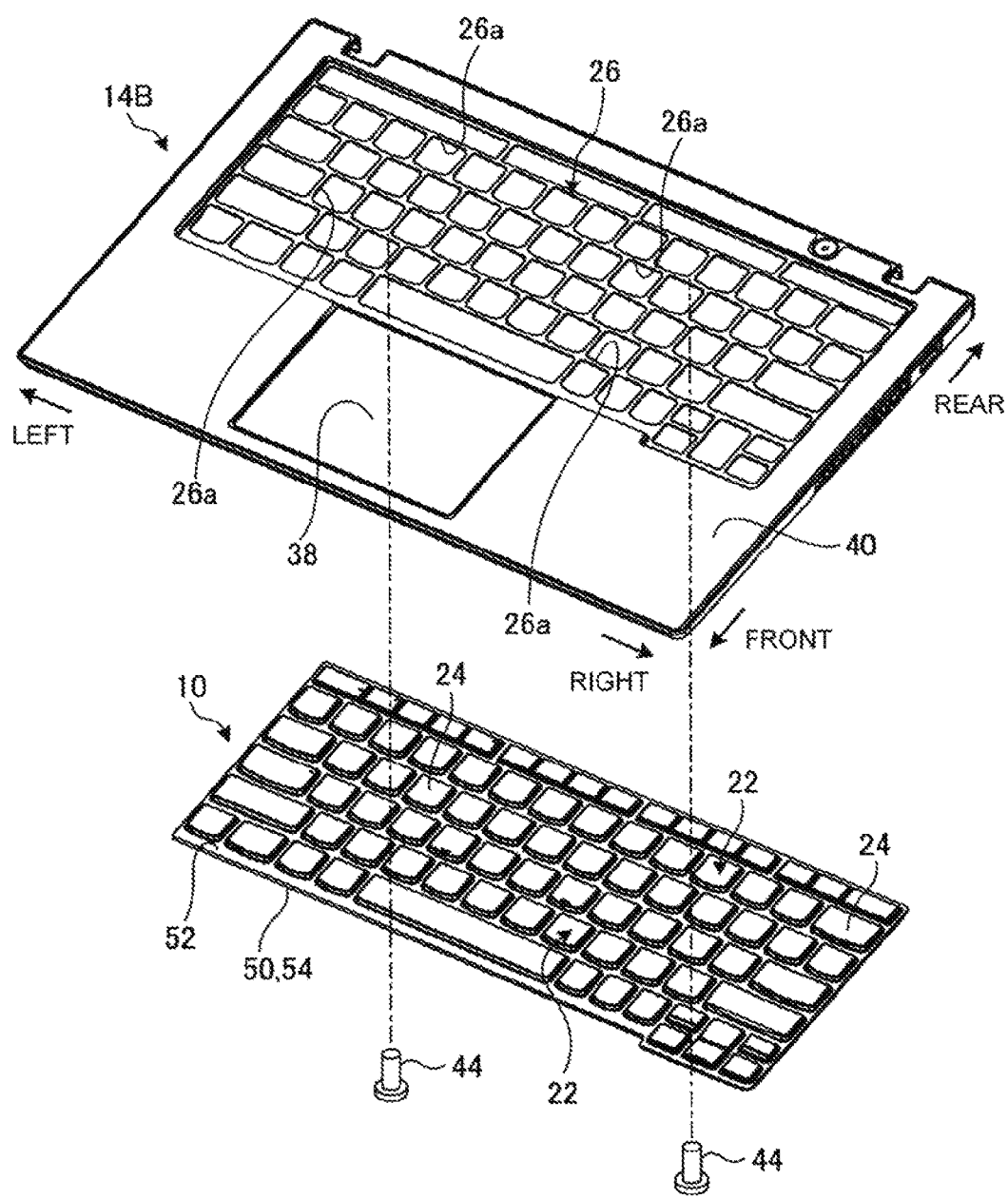
FIG. 3 is an exploded perspective views explaining a state of attaching the keyboard device to a body chassis of a second specification.

FIG. 2 is an exploded perspective view explaining a state of attaching the keyboard device 10 to the body chassis 14A of the first specification. FIG. 3 is an exploded perspective views explaining a state of attaching the keyboard device 10 to the body chassis 14B of the second specification.

As illustrated in FIG. 2, the body chassis 14A of the first specification is formed into a thin box shape with an upper cover 30 and a lower cover 32. In the upper cover 30, a storage recessed portion 30a of a shallow bathtub shape corresponding to the outer shape of the keyboard device 10 is formed in the upper surface thereof. In the storage recessed portion 30a, a plurality of hook members 34 are formed so as to project at appropriate positions of a bottom surface 30b thereof. In the bottom surface 30b, a plurality of hole portions 30c for passing wiring and the like, which are not illustrated, from the keyboard device 10 are also formed at appropriate positions.

In the case of the body chassis 14A, the keyboard device 10 is a top mount structure in which the keyboard device 10 is attached to the storage recessed portion 30a in such a manner as to be placed from above. In that case, the keyboard device 10 is fixed to the body chassis 14A by engaging all or some of the hook members 34 projecting from the bottom surface 30b with engagement holes 36 (see FIGS. 4A and 4B) provided in a lower surface 26b of the frame 26. The frame 26 is attached to the keyboard device 10 beforehand. The reference numeral 38 in FIGS. 2 and 3 denotes a touchpad serving as an input unit in place of a mouse. In this embodiment, attachment holes 10b for passing the hook members 34 are formed in a base plate 50 but engagement holes may be provided in the lower surface itself of the base plate 50, so that all or some of the hook members 34 may be engaged with the engagement holes.

As illustrated in FIG. 3, the body chassis 14B of the second specification is formed into a thin box shape with an upper cover 40 and a lower cover 42 (see FIG. 1). FIG. 3 illustrates only the upper cover 40. In the upper cover 40, a frame 26 is integrally formed on a top plate thereof. More specifically, in the upper cover 40, the top plate partially functions as the frame 26.

In the case of the body chassis 14B, the keyboard device 10 is a bottom mount structure in which the keyboard device 10 is attached to the frame 26 of the upper cover 40 from the bottom. In this case, a plurality of screws 44 is penetrated upward from the side of a lower surface 10a of the keyboard device 10 to be screwed into screw holes (hole portions) 46 provided in the lower surface 26b of the frame 26 (see FIGS. 5A and 5B), whereby the keyboard device 10 is fixed to the body chassis 14B. In this embodiment, through-holes 10c for passing the screws 44 are formed in the base plate 50 but screw holes may be provided in the lower surface itself of the base plate 50, so that the screws 44 may be screwed into the screw holes.

Thus, the keyboard device 10 of this embodiment can be shared between the body chassis 14A and 14B of the specifications. However, the frame 26 is provided with engagement holes 36 or screw holes 46 according to the body chassis 14A and 14B of the specification.

Figure 4A:
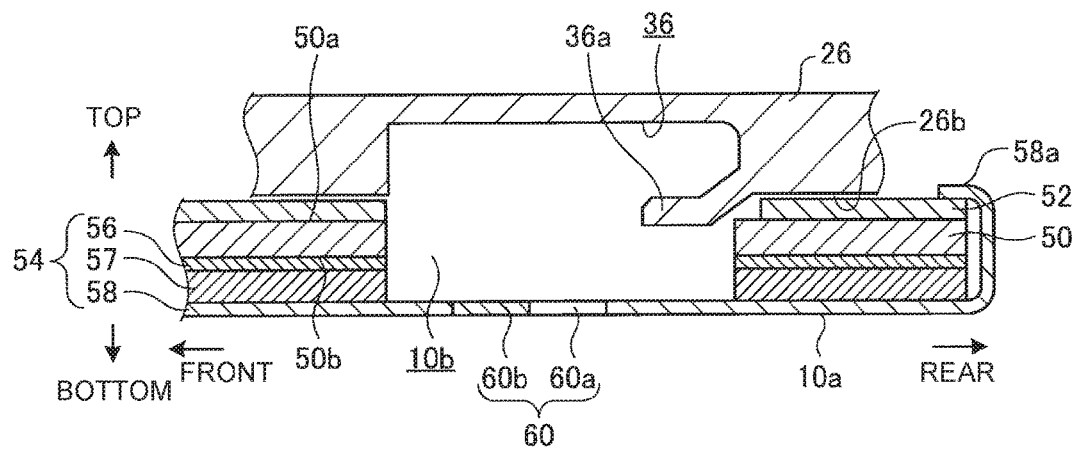
FIG. 4A is a side cross-sectional view schematically illustrating the cross-sectional structure in an engagement hole and a peripheral portion around the engagement hole before attaching the keyboard device to the body chassis of the first specification.
Figure 4B:
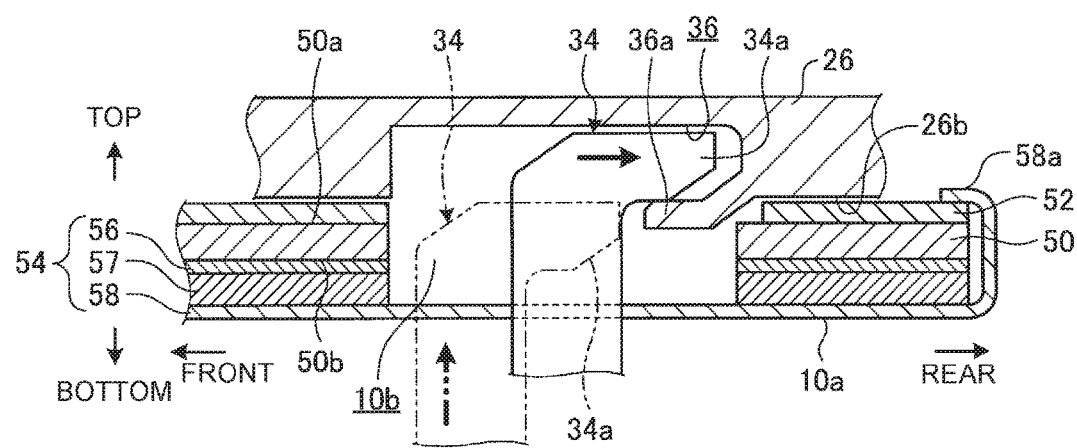
FIG. 4B is a side cross-sectional view in a state where a hook member is engaged with the engagement hole illustrated in FIG. 4A.
Figure 5A:
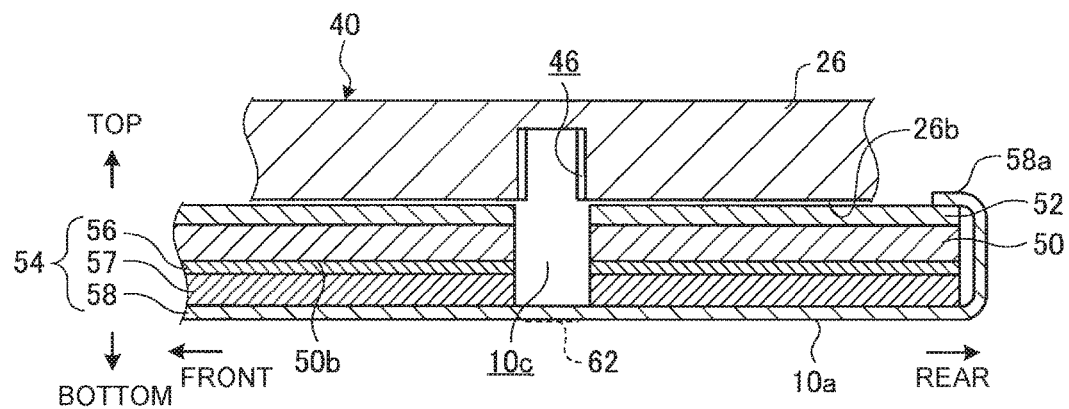
FIG. 5A is a side cross-sectional view schematically illustrating the cross-sectional structure in a screw hole and a peripheral portion around the screw hole before attaching the keyboard device to the body chassis of the second specification.
Figure 5B:
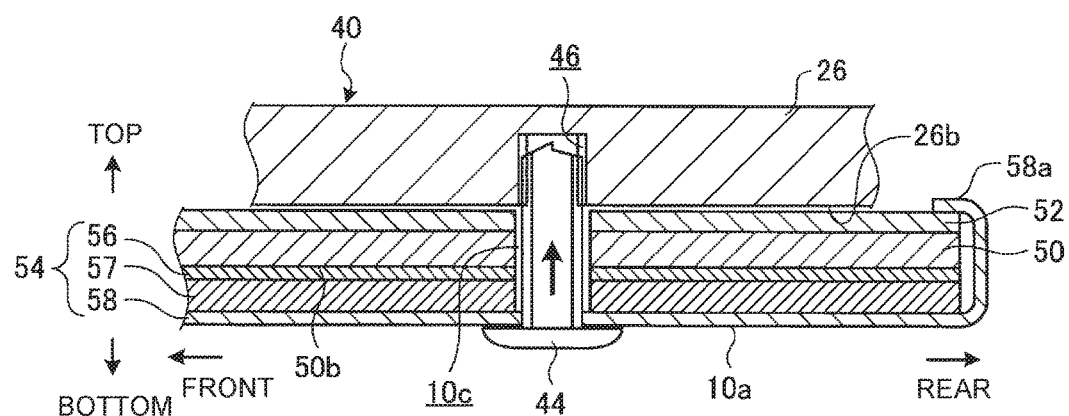
FIG. 5B is a side cross-sectional view in a state where a screw is engaged with the screw hole illustrated in FIG. 5A.

FIG. 4A is a side cross-sectional view schematically illustrating the cross-sectional structure in the engagement hole 36 and a peripheral portion around the same before attaching the keyboard device 10 to the body chassis 14A of the first specification. FIG. 4B is a side cross-sectional view in a state where the hook member 34 is engaged with the engagement hole 36 illustrated in FIG. 4A. FIG. 5A is a side cross-sectional view schematically illustrating the cross-sectional structure in the screw hole 46 and a peripheral portion around the same before the keyboard device 10 is attached to the body chassis 14B of the second specification. FIG. 5B is a side cross-sectional view in a state where the screw 44 is screwed into the screw hole 46 illustrated in FIG. 5A.

As illustrated in FIGS. 4A and 4B and FIGS. 5A and 5B, the keyboard device 10 has the base plate 50, a membrane sheet 52, and a back light sheet 54.

The base plate 50 is an attachment plate for the keys 22. The base plate 50 is obtained by subjecting a metal plate-like member, such as a stainless steel plate or an aluminum plate having a plate thickness of 0.3 mm, to lancing molding or punch molding, for example. In the keys 22, the keytops 24 are supported so as to be vertically movable using a guide mechanism and a rubber dome, which are not illustrated, on an upper surface 50a side of the base plate 50. The guide mechanism is a pantograph mechanism connecting the lower surface of the keytops 24 and the upper surface 50a of the base plate 50, for example. The rubber dome is a dome-shaped member formed with an elastic material having flexibility, such as silicone rubber, for example, and is disposed between the membrane sheet 52 and the keytops 24.

The membrane sheet 52 is laminated on the upper surface 50a of the base plate 50. The membrane sheet 52 is a switch sheet of a three layer structure in which a point of contact is closed when pressed, for example. In the membrane sheet 52, when a position where a stationary contact and a movable contact are overlapped with each other is pressed, for example, the stationary contact and the movable contact adheres to each other, whereby the point of contact is closed. The membrane sheet 52 may be laminated on the lower surface 50b side of the base plate 50. The above-described rubber dome presses the membrane sheet 52 when the keytops 24 are pressed down and returns the keytops 24 to the original position when the press-down operation of the keytops 24 is canceled.

The back light sheet 54 is laminated on the lower surface 50b of the base plate 50. The back light sheet 54 is a sheet-like member of a three layer structure in which a masking sheet 56, an optical guide plate 57, and a reflection sheet 58 are laminated downward in this order from the lower surface 50b side of the base plate 50. The masking sheet 56, the optical guide plate 57, and the reflection sheet 58 are bonded and fixed into one sheet shape with an adhesive, a double-sided tape, or the like. The back light sheet 54 guides light from a light source, such as an LED element, disposed at right and left centers or right and left end portions of the optical guide plate 57 in the horizontal direction with the optical guide plate 57, and is reflected upward on the light reflection surface of the reflection sheet 58. Thus, the back light sheet 54 irradiates the keytops 24 from the back surface through a predetermined light transmission position formed by the masking sheet 56. The reflection sheet 58 is a sheet-like member formed with polyethylene terephthalate (PET) and having waterproof performance, for example. The thickness of the reflection sheet 58 is about 0.020 to 0.025 mm, for example.

The back light sheet 54 has a bent portion 58a in an outer peripheral edge portion of the reflection sheet 58 of the bottom layer. The bent portion 58a is provided substantially over the entire outer peripheral edge portion of the base plate 50. The bent portion 58a is a portion in which the outer peripheral edge portion of the reflection sheet 58 is extended to the outside relative to the masking sheet 56 and the optical guide plate 57, and then bent upward so as to include the outer peripheral end surfaces thereof. An end portion of the bent portion 58a is bonded and fixed to an upper surface edge portion of the membrane sheet 52 using a bonding portion or a double-sided tape. Thus, in the keyboard device 10, the lower surface 10a has a bathtub shape formed by the reflection sheet 58 and the bent portion 58a of the edge portion thereof and has high waterproof performance. Also, when a waterproof sheet (sheet-like member) formed of rubber or resin is used, for example, in place of the back light sheet 54, the same waterproofing effect as that in the case of using the back light sheet 54 can be obtained.

As illustrated in FIG. 4A and FIG. 4B, the frame 26 used when attaching the keyboard device 10 to the body chassis 14A of the first specification is provided with a plurality of engagement holes 36 at appropriate positions of the lower surface 26b thereof. The frame 26 is fixed to the base plate 50 by an engagement structure or a screw structure utilizing through-holes formed in various places of the membrane sheet 52.

The engagement hole 36 has a shape which allows the insertion of the hook member 34 and allows the movement of the hook member 34 in the engagement direction (backside). The engagement hole 36 has an engagement portion 36a of a plate piece shape with which a claw portion 34a of the hook member 34 is engaged on the deep side in the engagement direction of the hook member 34. The hook member 34 has a shape in which the hook member 34 projects upward from the bottom surface 30b of the storage recessed portion 30a and the claw portion 34a projects backward (see FIGS. 4A and 4B and FIG. 6).

The keyboard device 10 has the attachment hole 10b into which the hook member 34 can be inserted at a position overlapping with a lower portion of each engagement hole 36. The attachment hole 10b penetrates the membrane sheet 52, the base plate 50, the masking sheet 56, and the optical guide plate 57 from the top to the bottom but does not penetrate the reflection sheet 58 serving as a waterproof sheet of the bottom layer. When the hook member 34 is engaged with the engagement hole 36, the reflection sheet 58 is broken by the hook member 34, whereby the attachment hole 10b is penetrated to the lower surface 10a. Then, the reflection sheet 58 has cut lines 60 assisting the punching of the hook member 34 at a position overlapping with the attachment hole 10b.

Even in the case of the body chassis 14A of the first specification serving as the mounting target of the keyboard device 10, the number of installation of the hook members 34 varies depending on the specification. Then, the frame 26 in this case is provided with the engagement holes 36 and the attachment holes 10b in a number to allow for the maximum number of the hook members 34 of the body chassis 14A of the first specification serving as the mounting target thereof.

In the frame 26 (upper cover 40) for use in attaching the keyboard device 10 to the body chassis 14B of the second specification, the plurality of screw holes 46 are formed so as to open at appropriate positions of the lower surface 26b as illustrated in FIG. 5A and FIG. 5B. The screw 44 can be screwed into the screw hole 46. When the screw 44 is a tapping screw or the like, the screw hole 46 may have a shape not having a female screw shape.

The keyboard device 10 has a through-hole 10c through which the screw 44 can be passed at a position overlapping with a lower portion of each screw hole 46. The through-hole 10c penetrates the membrane sheet 52, the base plate 50, the masking sheet 56, and the optical guide plate 57 from the top to the bottom but does not penetrate the reflection sheet 58 serving as a waterproof sheet of the bottom layer. When the screw 44 is screwed into the screw hole 46, the reflection sheet 58 is punched by the screw 44, whereby the through-hole 10c is penetrated to the lower surface 10a. Then, the reflection sheet 58 is provided with a mark 62 indicating a fastening position of the screw 46 at a position overlapping with the through-hole 10c.

Even in the case of the body chassis 14B of the second specification serving as the mounting target of the keyboard device 10, the number of the screws 44 used varies depending on the specification. Then, the keyboard device 10 has the through-holes 10c in a number to allow for the maximum use number of the screws 44 of the body chassis 14B of the second specification serving as the mounting target thereof.

Figure 7:
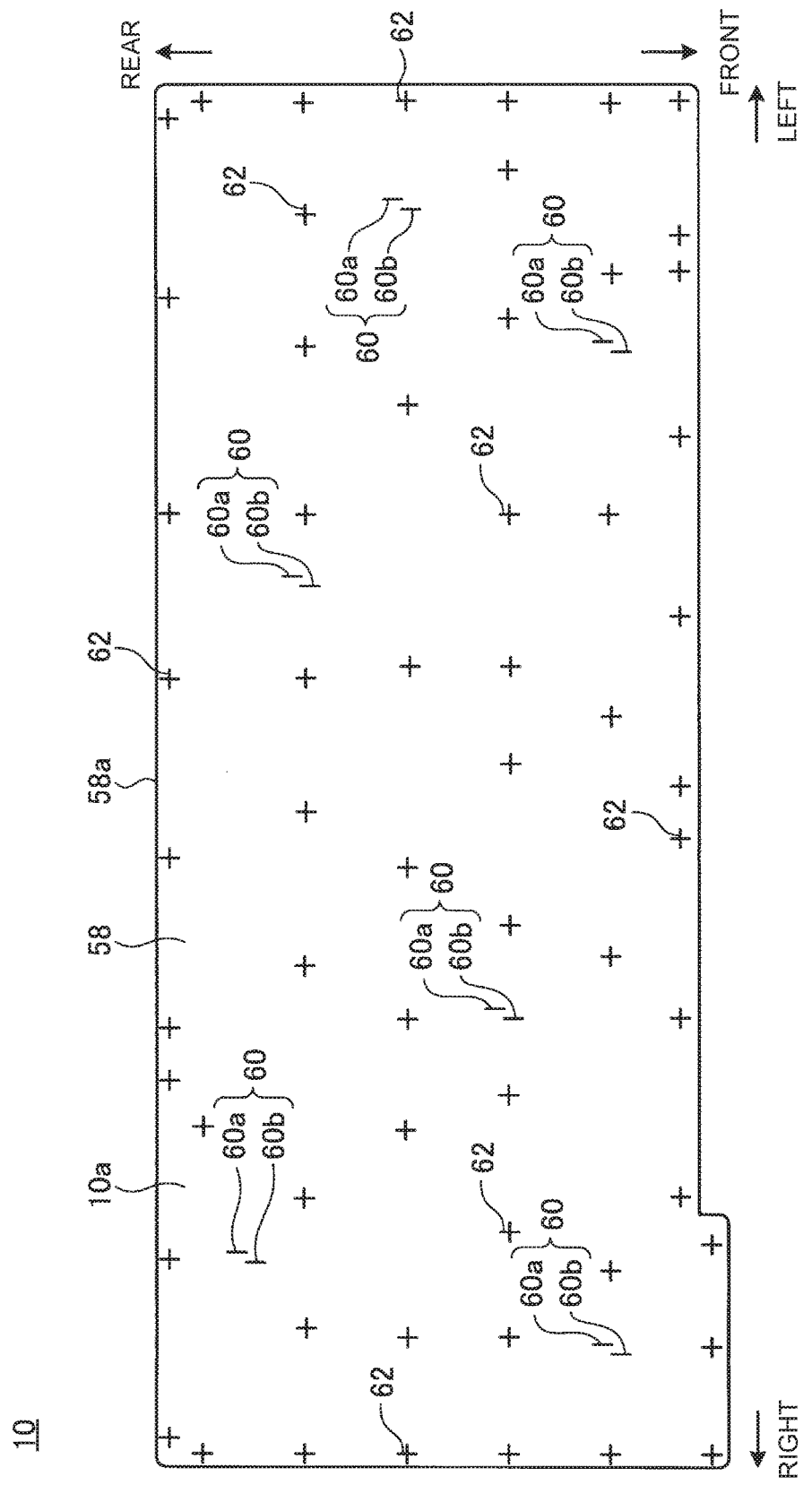
FIG. 7 is a bottom plan view in which the keyboard device is viewed from the lower surface side.
Figure 8:
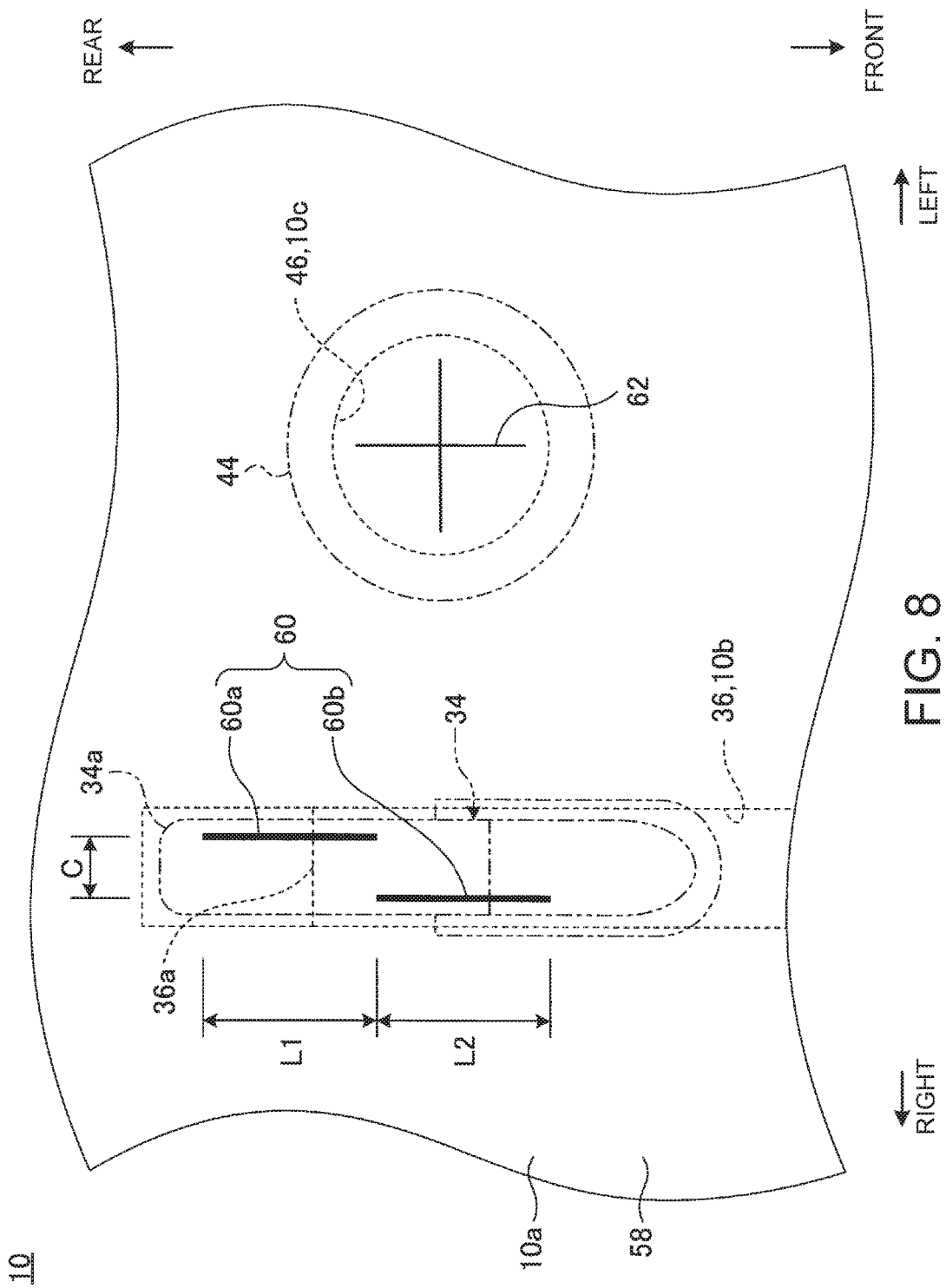
FIG. 8 is an enlarged view of a principal portion of the lower surface of the keyboard device illustrated in FIG. 7.

FIG. 7 is a bottom plan view when the keyboard device 10 is viewed from the lower surface 10a side. FIG. 8 is an enlarged view of a principal portion of the lower surface 10a of the keyboard device 10 illustrated in FIG. 7.

As illustrated in FIG. 7, the lower surface 10a of the keyboard device 10 is provided with the plurality of cut lines 60 and a plurality of marks 62. The cut lines 60 are individually provided at positions overlapping with the attachment holes 10b and the engagement holes 36 in the vertical direction. The marks 62 are individually provided at positions overlapping with the through-holes 10c and the screw holes 46 in the vertical direction.

As illustrated in FIG. 7 and FIG. 8, each cut line 60 contains one set of two lines of a first line 60a and a second line 60b. The lines 60a and 60b are slits obtained by cutting the reflection sheet 58 in the thickness direction. The lines 60a and 60b are formed by piercing the reflection sheet 58 with a cutting tool having a shape of a very thin cutter. Thus, the inner wall surfaces facing each other of the lines 60a and 60b adhere to each other, so that a substantial gap is zero or the minimum, and thus the lines 60a and 60b are structured so as not pass at least liquid, such as water. In the case of this embodiment, the lines 60a and 60b are formed using a cutting tool referred to as a Thomson die (punching die), for example. Thus, in the cut lines 60 (first line 60a and second line 60b), slits are formed but the slits are slits having such a narrow width as not to pass liquid. It is preferable for the cut lines 60 to cause no leakage of water even when 20 mm or more water pressure is applied thereto, for example. In this embodiment, the cut lines 60 penetrate the reflection sheet 58 in the thickness direction but may be configured so as not to penetrate the reflection sheet 58.

As illustrated in FIG. 8, the lines 60a and 60b of the cut line 60 are disposed so as to be positionally shifted from each other with respect to the engagement direction with respect to the engagement hole 36 of the hook member 34 (forward and backward direction, i.e., projection direction of the claw portion 34a) and a direction orthogonal to the engagement direction (horizontal direction, i.e., width direction of the claw portion 34a). More specifically, the lines 60a and 60b are disposed in parallel (or substantially parallel) to each other or in a staggered shape (zigzag shape) and both the lines 60a and 60b are disposed at positions overlapping with the engagement hole 36 and the hook member 34 in the vertical direction. FIG. 8 illustrates an example of the configuration in which the positions in the engagement direction of the front end of the first line 60a and the rear end of the second line 60b (forward and backward direction) are aligned with each other but the positions of the front end and the rear end may be somewhat positionally shifted from each other in the engagement direction.

Figure 6:
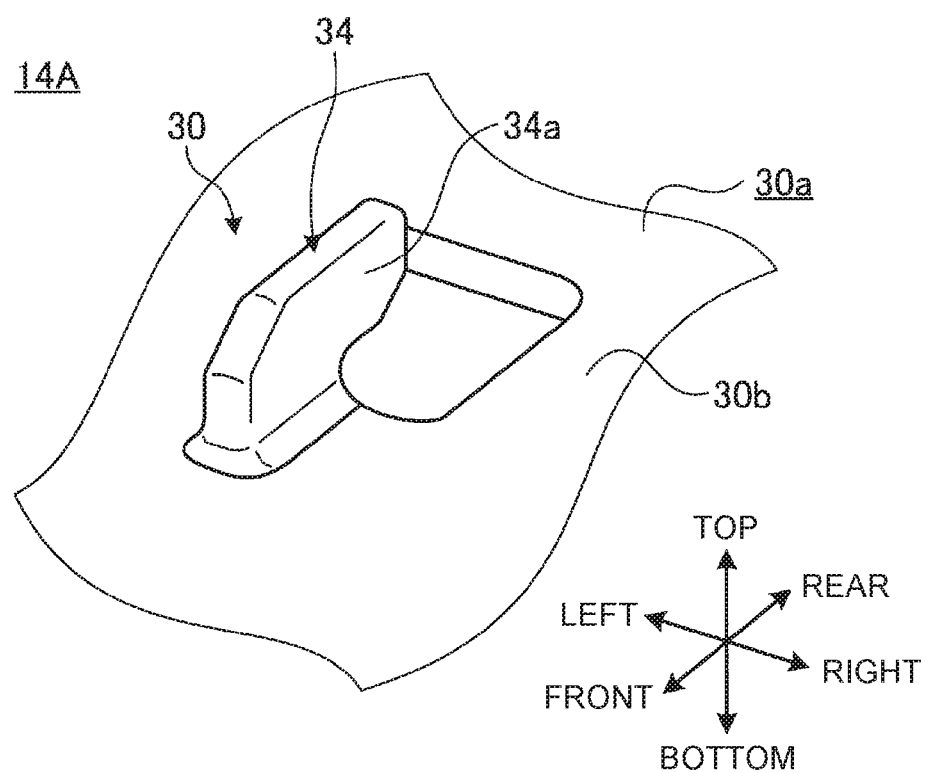
FIG. 6 is an enlarged perspective diagram illustrating an example of the configuration of a hook member.

In the case of this embodiment, the length dimension in the engagement direction of the hook member 34 (length in the forward and backward direction of the hook member 34 in FIG. 4B) is about 3 to 6 mm. Then, in the cut line 60, length dimensions L1 and L2 of the lines 60a and 60b, respectively, are set to about 2 mm and an interval C between the lines 60a and 60b is set to about 0.5 mm. As a result, the hook member 34 having a plate thickness of about 0.5 to 1 mm is pressed against the line 60 as illustrated in FIG. 6, whereby the reflection sheet 58 can be smoothly broken through by the hook member 34 with the lines 60a and 60b as the starting points. In this case, with respect to the cut line 60, the lines 60a and 60b are disposed in the staggered shape, and therefore the strength of a portion sandwiched between the front end of the first line 60a and the rear end of the second line 60b the cut line 60 is lower than the other portions. Then, the hook member 34 can easily break through the reflection sheet 58 with the portion as the starting point. The length dimensions L1 and L2 of the cut line 60 or the interval C between the cut lines 60a and 60b can be varied as appropriate according to the shape of the hook member 34, the material, thickness, and the like of the reflection sheet 58, or the like, for example.

There is a concern that, when the cut line 60 is excessively long, the inner wall surfaces facing each other are positionally shifted in the thickness direction, so that the leakage of water may be caused. Then, in the cut line 60, the two short lines 60a and 60b are alternately disposed, whereby both the securing of the waterproof performance and the ease of breaking through by the hook member 34 can be achieved.

As illustrated in FIG. 8, each mark 62 is a target of a cross shape or the like printed on the reflection sheet 58 and indicates the center of each through-hole 10c and each screw hole 46, for example. In the case of this embodiment, the through-holes 10c and the screw holes 46 are covered with the reflection sheet 58, and therefore the positions thereof cannot be visually recognized from the lower surface 10a side of the keyboard device 10. Then, the marks 62 clearly indicate the positions of the through-holes 10c and the screw holes 46. By punching the screws 44 at the positions, the screws 44 can smoothly break through the reflection sheet 58 to be screwed into the screw holes 46, and thus high working efficiency is obtained. However, the marks 62 may be omitted when the keyboard device 10 is fixed to the body chassis 14B in a manufacturing process of controlling the position of the screws 44 not manually but using a machine mechanism or the like, for example.

As described above, the lower surface 10a side of the keyboard device 10 according to this embodiment is covered with the reflection sheet 58 which is a sheet-like member having waterproof properties. Therefore, even when liquid accidentally enters between the keys 22, the liquid can be trapped on the upper surface side of the reflection sheet 58, and thus the leakage of water into the body chassis 14A and 14B disposed under the reflection sheet 58 can be prevented. In this case, the reflection sheet 58 is provided with the cut lines 60 at positions overlapping with the attachment holes 10b and the engagement holes 36 for the engagement of the hook member 34 in the vertical direction. Therefore, when the hook member 34 on the body chassis 14A side is engaged with the engagement hole 36 through the attachment hole 10b, the reflection sheet 58 can be easily broken through by the hook member 34 utilizing the cut line 60. As a result, the keyboard device 10 can be easily attached to the body chassis 14A. Moreover, when broken through by the hook member 34, the cut line 60 adheres to the hook member 34, so that the waterproof performance is secured. Also, when not broken through by the hook member 34, the inner wall surfaces adhere to each other, so that the waterproof performance is secured. Therefore, when the keyboard device 10 is attached to the body chassis 14A having a small number of installation of the hook members 34, for example, the leakage of water in the cut lines 60 corresponding to the attachment holes 10b and the engagement holes 36 which are not used is also prevented. Thus, the keyboard device 10 has high versatility and high waterproof performance.

When the keyboard device 10 has a configuration of not using the frame 26, for example, the engagement hole 36 may be formed in the base plate 50. In this case, the attachment hole 10b is configured so as to penetrate the masking sheet 56 and the optical guide plate 57 and to be provided with an engagement portion in a portion of the base plate 50.

The keyboard device 10 is provided with the through-hole 10c which is a hole portion through which the screw 44 can be passed above the reflection sheet 58. The body chassis 14B serving as the mounting target thereof has the screw hole 46 which is a hole portion into which the screw 44 can be screwed. Then, the through-holes 10c and the screw holes 46 are provided at positions not overlapping with the cut lines 60 in the vertical direction and are covered with the reflection sheet 58. Therefore, the keyboard device 10 is compatible with a method for fixing the keyboard device 10 to the body chassis 14B using a screw 44 in place of a hook member 34 and the versatility is further improved. Moreover, the reflection sheet 58 is configured so as not to have hole portions in portions corresponding to the through-hole 10c and the screw holes 46 and to be broken through with the screws 44. Therefore, even when the number of installation screws 44 is small or even when the keyboard device 10 is fixed to the body chassis 14A using the hook members 34, the waterproof performance in the portions corresponding to the through-holes 10c and the screw holes 46 which are not used can be secured. In this case, it is a matter of course that the keyboard device 10 is also prevented from the leakage of water in the cut line 60. The fixed structure using the screws 44 may be used in combination with the fixed structure using the hook members 34.

For example, when the keyboard device 10 is configured so as not to use the frame 26, for example, the screw hole 46 may be formed in the base plate 50. In this case, the through-hole 10c is structured so as to penetrate the masking sheet 56 and the optical guide plate 57.

The cut line 60 described above may have a shape other than the shape illustrated in FIG. 8 insofar as the reflection sheet 58 can be smoothly broken through by the hook member 34.

Figure 9:
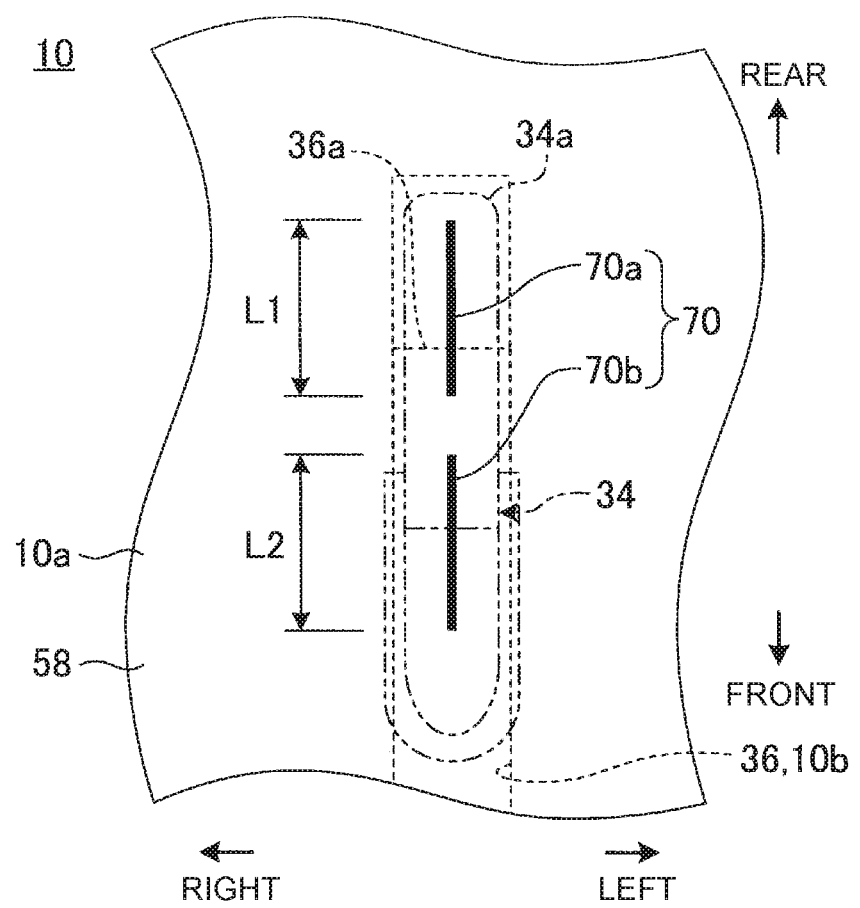
FIG. 9 is a bottom plan view illustrating the configuration of cut lines according to a first modification.

FIG. 9 is a bottom plan view illustrating the configuration of a cut line 70 according to a first modification. As illustrated in FIG. 9, the cut line 70 contains one set of two lines of a first line 70a and a second line 70b. The lines 70a and 70b are disposed in a line in the engagement direction with respect to the engagement hole 36 of the hook member 34 (forward and backward direction, i.e., projection direction of the claw portion 34a) and both the lines 70a and 70b are disposed at positions overlapping with the attachment holes 10b, the engagement holes 36, and the hook members 34 in the vertical direction. The lines 70a and 70b are formed in the same shape as that of the lines 60a and 60b illustrated in FIG. 8, except a difference in the arrangement.

Figure 10:
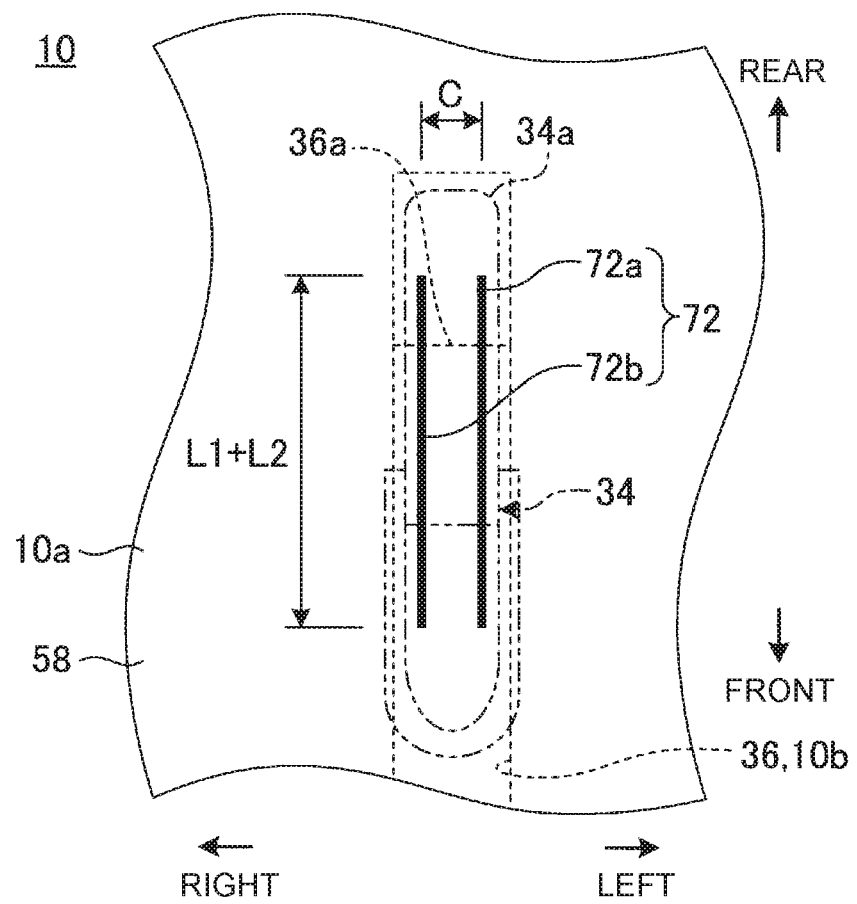
FIG. 10 is a bottom plan view illustrating the configuration of cut lines according to a second modification.

FIG. 10 is a bottom plan view illustrating the configuration of a cut line 72 according to a second modification. As illustrated in FIG. 10, the cut line 72 contains one set of two lines of a first line 72a and a second line 72b. Each of the lines 72a and 72b has a length dimension (L1+L2) obtained by adding the length dimensions L1 and L2 of the lines 60a and 60b, respectively, illustrated in FIG. 8. The lines 72a and 72b are disposed side by side in a direction (horizontal direction) orthogonal to the engagement direction with respect to the engagement hole 36 of the hook member 34 (projection direction of the claw portion 34*a*).

Figure 11:
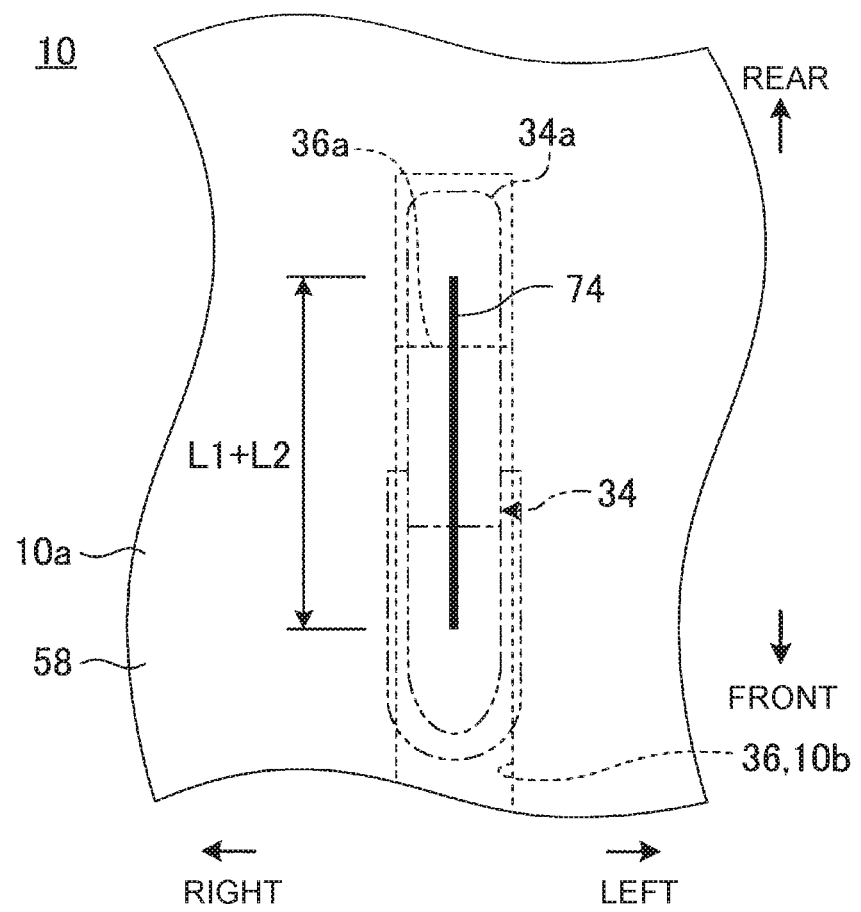
FIG. 11 is a bottom plan view illustrating the configuration of cut lines according to a third modification.

FIG. 11 is a bottom plan view illustrating the configuration of a cut line 74 according to a third modification. As illustrated in FIG. 11, the cut line 74 is formed in the same shape as the shape of the first line 72*a* (or second line 72*b*) and illustrated in FIG. 10 and contains one set of one line.

It is a matter of course that the present invention is not limited to the embodiments described above and can be freely altered without deviating from the scope of an aspect of the present invention.

What is claimed is:

1. A keyboard device comprising:
a base plate having a plurality of attachment holes through which a plurality of hook members in a chassis of an electronic device are configured to pass;
a sheet-like member covering a lower surface of the base plate; and
a plurality of keytops provided on an upper surface of the base plate, wherein
the sheet-like member is provided with cut lines cut in a thickness direction at positions overlapping with the attachment holes in a vertical direction, and
the hook members are configured to break through the sheet-like member through at least some of the cut lines, and the cut lines with the sheet-like member provide a waterproof barrier before the cut lines are broken through.

2. The keyboard device according to claim 1, wherein the cut lines extend along a projection direction of claw portions of the hook members in attaching the hook members to the attachment holes.

3. The keyboard device according to claim 2, wherein the cut lines are provided in sets of two lines to one attachment hole and the two lines of each set are disposed approximately parallel to each other.

4. The keyboard device according to claim 1, wherein the cut lines are disposed at positions overlapping with an outer shape of the attachment holes as viewed in plan.

5. The keyboard device according to claim 1, wherein the base plate is further provided with a plurality of hole portions through which screws are configured to pass, and
the hole portions are provided at positions not overlapping with the cut lines in a vertical direction and are covered with the sheet-like member.

6. The keyboard device according to claim 5, wherein the sheet-like member is provided with marks indicating positions of hole portions at positions overlapping with the hole portions in a vertical direction.

7. A keyboard device comprising:
a base plate having a plurality of attachment holes through which a plurality of hook members provided in a chassis of an electronic device are configured to pass;
a sheet-like member covering a lower surface of the base plate; and
a plurality of keytops provided on an upper surface of the base plate, wherein
the sheet-like member is provided with cut lines cut in a thickness direction at positions overlapping with the attachment holes in a vertical direction,
the cut lines extend along a projection direction of claw portions of the hook members in attaching the hook members to the attachment holes
the cut lines are provided in sets of two lines to one attachment hole and the two lines of each set are disposed approximately parallel to each other, and
the two lines of each set are positionally shifted from each other with respect to the projection direction of the claw portions and a direction orthogonal to the projection direction of the claw portions.

8. An electronic device, comprising
a chassis; and
a keyboard device that includes
a base plate having a plurality of attachment holes through which a plurality of hook members provided in the chassis are configured to pass;
a sheet-like member covering a lower surface of the base plate; and
a plurality of keytops provided on an upper surface of the base plate, wherein
the sheet-like member is provided with cut lines cut in a thickness direction at positions overlapping with the attachment holes in a vertical direction; wherein
the hook members break through the sheet-like member through at least some of the cut lines and are engaged with the attachment holes, whereby the keyboard device is fixed to the chassis, and
the cut lines with the sheet-like member provide a waterproof barrier before the cut lines are broken through.

9. An electronic device, comprising:
a chassis;
a keyboard device that includes
a base plate having a plurality of attachment holes through which a plurality of hook members provided in the chassis are configured to pass,
a sheet-like member covering a lower surface of the base plate; and
a plurality of keytops provided on an upper surface of the base plate, wherein
the sheet-like member is provided with cut lines cut in a thickness direction at positions overlapping with the attachment holes in a vertical direction; and
a frame attached to an upper surface side of the base plate and dividing the keytops; wherein
the hook members break through the sheet-like member through at least some of the cut lines and are engaged with engagement holes provided in the lower surface of the frame through the attachment holes, whereby the keyboard device is fixed to the chassis, and
the cut lines with the sheet-like member provide a waterproof barrier before the cut lines are broken through.

* * * * *